(12) United States Patent
Kato et al.

(10) Patent No.: US 6,697,299 B2
(45) Date of Patent: Feb. 24, 2004

(54) INDIVIDUAL AUTHENTICATION METHOD, INDIVIDUAL AUTHENTICATION APPARATUS, INFORMATION COMMUNICATION APPARATUS EQUIPPED WITH THE APPARATUS, AND INDIVIDUAL AUTHENTICATION SYSTEM INCLUDING THE APPARATUS

(75) Inventors: Makoto Kato, Kyoto (JP); Masahiko Hashimoto, Shijohnawate (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 4 days.

(21) Appl. No.: 09/985,935

(22) Filed: Nov. 6, 2001

(65) Prior Publication Data

US 2002/0057805 A1 May 16, 2002

(30) Foreign Application Priority Data

Nov. 8, 2000 (JP) ........................ 2000-340007

(51) Int. Cl.$^7$ ............................................ H04R 29/00
(52) U.S. Cl. .................... 367/87; 367/136; 367/191
(58) Field of Search ................. 367/191, 136, 367/87; 340/5.82; 600/559, 587; 73/585; 181/0.5; 713/186; 382/115; 381/56, 159

(56) References Cited

U.S. PATENT DOCUMENTS

| | | |
|---|---|---|
| 4,009,707 A | 3/1977 | Ward |
| 4,406,921 A | 9/1983 | von Recklinghausen |
| 4,429,702 A | 2/1984 | von Recklinghausen |
| 5,105,822 A | 4/1992 | Stevens et al. |
| 5,787,187 A * | 7/1998 | Bouchard et al. ........... 382/115 |

FOREIGN PATENT DOCUMENTS

| | | |
|---|---|---|
| FR | 2678821 A1 | 1/1993 |
| JP | 10-283472 | 10/1998 |
| JP | 2000-030063 | 1/2000 |

OTHER PUBLICATIONS

Allen, J. B., *Measurement of Eardrum Acoustic Impedance*, Lecture notes in biomathematics, Springer Verlag, Aug. 13, 1985, pp. 44–51, vol. 64, Berlin, Germany.

Herbert Hudde, *Measurement of the Eardrum Impedance of Human Ears*, Journal of the Acoustical Society of America, Jan. 1983, vol. 73(1), pp. 242–247, Ruhr University, Bochum, Germany.

* cited by examiner

Primary Examiner—Daniel T. Pihulic
(74) Attorney, Agent, or Firm—Browdy and Neimark, P.L.L.C.

(57) ABSTRACT

The object of the present invention is to provide an individual authentication method and apparatus that use no bulky apparatuses, are insusceptible to forgery, and use an auditory organ which is almost independent of health condition and aging, is little subject to physiological rejection, and exists in everyone. To achieve this object, the present invention comprises a sound receiving/sending part, a signal processing part for performing signal processing for information of sound to be received and sent, a storing part for storing acoustic characteristic information of an auditory organ, and a signal processing part that controls sound receiving and sending, and saves, compares and identifies acoustic characteristic information, whereby whether an authentication examinee is one of authentication subjects can be determined by comparing acoustic characteristic information of an auditory organ collected in advance and acoustic characteristic information of an auditory organ measured in the authentication examinee.

15 Claims, 6 Drawing Sheets

INDIVIDUAL AUTHENTICATION METHOD, INDIVIDUAL AUTHENTICATION APPARATUS, INFORMATION COMMUNICATION APPARATUS EQUIPPED WITH THE APPARATUS, AND INDIVIDUAL AUTHENTICATION SYSTEM INCLUDING THE APPARATUS

BACKGROUND OF THE INVENTION

1. Field of the Invention

The present invention relates to an individual authentication method and an individual authentication apparatus, and an information communication apparatus equipped with the apparatus and an individual authentication system including the apparatus.

2. Description of the Prior Art

Conventionally, as a method of authenticating an individual, physical characteristics specific to the individual such as, e.g., fingerprints, retina pattern, iris, handwriting, face image, and voice have been used. In JP-A No. H10-283472, an individual authentication system is disclosed which extracts the characteristics of a human face image from human face image data and uses it for individual authentication.

However, the invention described in the patent application has a problem in that an apparatus becomes bulky because of a camera used to capture a face image and a calculating apparatus for binarizing the captured image. Also, individual authentication using fingerprints or handwriting has a problem in that the possibility of forgery cannot be eliminated. Individual authentication using face images or voice has a problem in that authentication accuracy depends greatly on individual health condition and aging. Individual authentication using retina patterns or iris has a problem in that it involves act physiologically undesirable to human, such as eyes that must be brought close to a measuring apparatus.

Recently, illegal use of information communication apparatuses by other than owners thereof has become conspicuous. Conventional illegal use by other than owners has been such that phone rates not chargeable on owners are chargeable on the owners. However, in the future, online shopping and online banking through information communication apparatuses are expected to come into wider use, in which case authentication is required to see if a current talker or operator matches the owner of the information communication apparatus.

SUMMARY OF THE INVENTION

The present invention has been made in view of the above circumstances and provides an individual authentication method and apparatus that use no bulky apparatuses, are insusceptible to forgery, and use an auditory organ which is almost independent of health condition and aging, is little subject to physiological rejection, and exists in everyone, an information communication apparatus that can effectively use the information communication apparatus, and an individual authentication system that can easily authenticate a current talker or operator to see if he (or she) is the owner of the information communication apparatus.

To solve the above problems, according to one aspect of the present invention, there is provided an individual authentication method that uses acoustic characteristics of an auditory organ; preferably, authentication is performed by comparing acoustic characteristic information collected in advance and measured acoustic characteristic information, and particularly, the acoustic characteristic information is preferably acoustic impedance or reflected wave characteristic information.

According to another aspect of the present invention, there is provided an individual authentication apparatus, comprising: a means for measuring acoustic characteristic information of an auditory organ wherein the means includes a sound receiving/sending part and a signal processing part for performing signal processing for information of sound to be received and sent; and a means for authenticating individuals by using a storing part for storing acoustic characteristic information of an auditory organ collected in advance, and a signal processing part that compares the stored acoustic characteristic information and measured acoustic characteristic information. The sound receiving/sending part may comprise separate members as a sound sending part and a sound receiving part. The acoustic characteristic information may be acoustic impedance, and further the sound receiving/sending part, and the sound sending part and/or the sound receiving part may be piezoelectric elements or voice coils.

According to another aspect of the present invention, there is provided an individual authentication apparatus, comprising: a means for measuring acoustic characteristic information of an auditory organ wherein the means includes a sound sending part and a signal processing part for performing signal processing for sound information; and a means for authenticating individuals wherein the means comprises a storing part for storing acoustic characteristic information of an auditory organ collected in advance, and a signal processing part that compares the stored acoustic characteristic information and measured acoustic characteristic information. The acoustic characteristic information may be acoustic impedance, and further the sound sending part may be piezoelectric elements or voice coils.

According to another aspect of the present invention, there is provided an information communication apparatus equipped with an individual authentication apparatus, the individual authentication apparatus comprising: a means for measuring acoustic characteristic information of an auditory organ wherein the means includes a loudspeaker for receiving and sending sound and a signal processing part for performing signal processing for information of sound to be received and sent; and a means for authenticating individuals wherein the means includes a storing part for storing acoustic characteristic information of an auditory organ collected in advance, and a signal processing part that compares the stored acoustic characteristic information and measured acoustic characteristic information. According to another aspect of the present invention, there is provided an information communication apparatus equipped with an individual authentication apparatus, the individual authentication apparatus comprising: a means for measuring acoustic characteristic information of an auditory organ wherein the means includes a loudspeaker for sending sound, a microphone for receiving sound, and a signal processing part for performing signal processing for information of sound to be received and sent; and a means for authenticating individuals wherein the means includes a storing part for storing acoustic characteristic information of an auditory organ collected in advance, and a signal processing part that compares the stored acoustic characteristic information and measured acoustic characteristic information. According to another aspect of the present invention, there is provided The information communication apparatus equipped with an individual authentication apparatus, the individual authentication apparatus comprising: a means for measuring acoustic characteristic information of an auditory organ wherein the means includes a loudspeaker for sending sound, and a signal processing part for performing signal processing for sound information; and a means for authenticating individuals wherein the means includes a storing part for storing acoustic characteristic information of an auditory organ collected in advance, and a signal processing part that compares the stored acoustic characteristic information and measured acoustic characteristic information. The acoustic characteristics may be acoustic impedance, the loudspeaker and/or microphone may employ piezoelectric elements or voice coils, and furthermore, sound sent from the loudspeaker may be voice, a ringing tone used to call individuals, or a special tone used to authenticate individuals.

According to another aspect of the present invention, there is provided an individual authentication system in which: an authentication examinee has a means for measuring acoustic characteristic information of an auditory organ wherein the means include a sound sending function, a sound receiving function, and a signal processing part for sound to be received and sent; an authentication executor has acoustic characteristic information of an auditory organ of authentication subjects collected in advance; and the authentication executor authenticates individuals by comparing acoustic characteristic information of an auditory organ of the authentication examinee measured using the means for measuring acoustic characteristic information of an auditory organ, and the acoustic characteristic information of an auditory organ of the authentication subjects collected in advance. According to another aspect of the present invention, there is provided an individual authentication system in which: an authentication examinee has a means for measuring acoustic characteristic information of an auditory organ wherein the means include a sound sending function and a signal processing part for sound; an authentication executor has acoustic characteristic information of an auditory organ of authentication subjects collected in advance; and the authentication executor authenticates individuals by comparing acoustic characteristic information of an auditory organ of the authentication examinee measured using the means for measuring acoustic characteristic information of an auditory organ, and the acoustic characteristic information of an auditory organ of the authentication subjects collected in advance.

By the invention, there are obtained a simple individual authentication method, an individual authentication apparatus, and an information communication apparatus equipped with the apparatus, and an individual authentication system including the apparatus.

As has been described above, by using acoustic characteristic information of an auditory organ, there can be provided a simple individual authentication method that uses no bulky apparatuses, is insusceptible to forgery, and uses an auditory organ which is almost independent of health condition and aging, is little subject to physiological rejection, and exists in everyone.

These objects and advantages of the present invention will become more apparent from embodiments that will be described hereinafter with reference to the accompanying drawings.

DESCRIPTION OF THE PREFERRED EMBODIMENTS

Hereinafter, preferred embodiments of the present invention will be described with reference to the accompanying drawings.

(First Embodiment)

Figure 1:
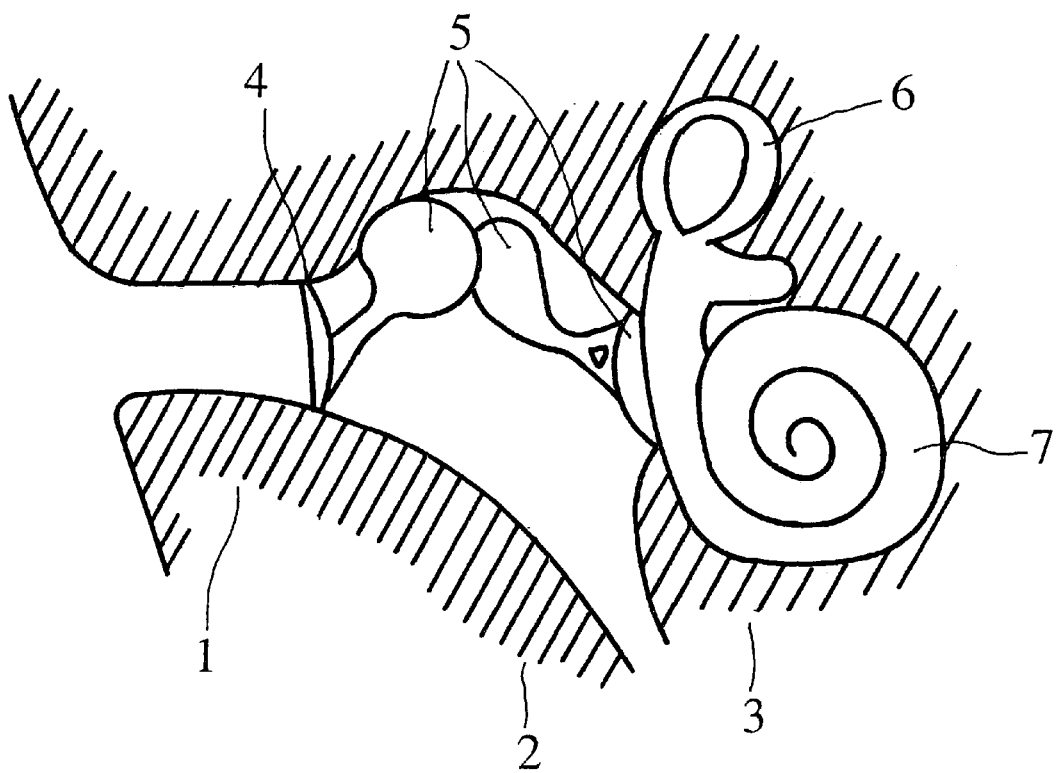
FIG. 1 is a schematic diagram of an auditory organ of one embodiment of the present invention.

A schematic diagram of a human auditory organ is shown in FIG. 1. In the drawing, the reference numeral 1 designates an external ear; 2, a middle ear; 3, an internal ear; 4, an eardrum; 5, auditory ossicles; 6, semicircular canal; and 7, cochlea. The auditory organ comprises the external ear 1, the middle ear 2, and the internal ear 3, and their auditory characteristic information exhibits characteristics specific to individuals. The use of such characteristics specific to individuals enables individuals to be authenticated.

As a concrete example, acoustic characteristic information of an auditory organ of individuals to be authenticated, that is, authentication subjects, is collected in advance, acoustic characteristic information of an auditory organ of an authentication examinee is actually measured at a place where authentication is required, and the acoustic characteristic information collected in advance and the acoustic characteristic information of the auditory organ of the authentication examinee actually measured are compared to determine whether the authentication examinee is an authentication subject.

Therefore, if an appropriate measuring means is provided for acoustic characteristic information to be collected and measured, and a means for comparing and identifying the obtained information is provided, it can be judged whether the authentication examinee is an authentication subject.

A method of authenticating individuals by comparing and identifying acoustic characteristic information may be implemented by a software program, the program may be saved in recording media and read into comparing and judging means for execution as required, or it may be downloaded from the outside by some communication means such as wireless communications and the Internet as required and be read into the comparing and judging means.

Sounds used to obtain acoustic characteristic information may be audible sound waves of relatively low frequencies or nonaudible sound waves of relatively high frequencies such as ultrasound.

As acoustic characteristic information used for identification, it is preferable to use acoustic impedance or reflected wave characteristic information because they are easy to actually collect and measure, and contribute to the fabrication of a compact and lightweight measuring means. That is, the acoustic impedance can be easily obtained using electrical impedance obtained by measuring circuit voltages and currents, and as the reflected wave characteristic information, for example, the positions and amplitudes of reflected waves reflected in different places within the auditory organ on a time axis can be used.

(Second Embodiment)

In the present embodiment, the authentication method described in the first embodiment will be described in more detail.

Figure 2:
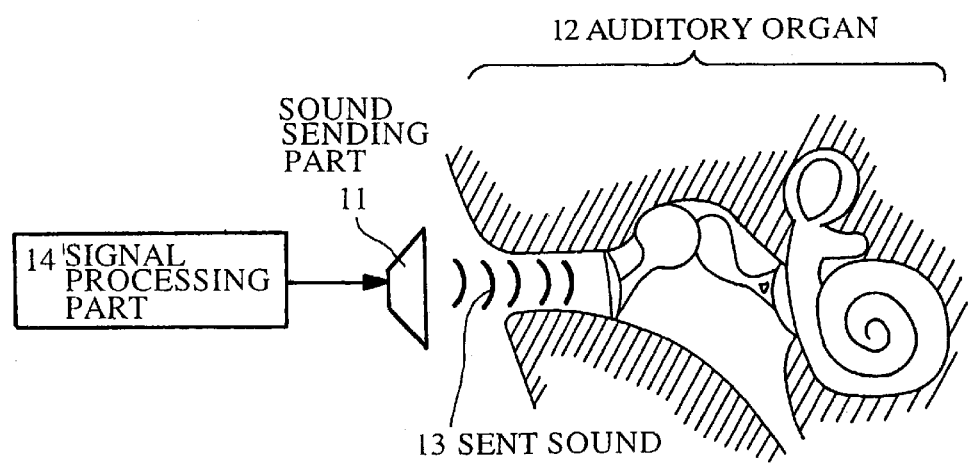
FIG. 2 is schematic diagrams showing measurement of acoustic characteristics of one embodiment of the present invention.
Figure 2:
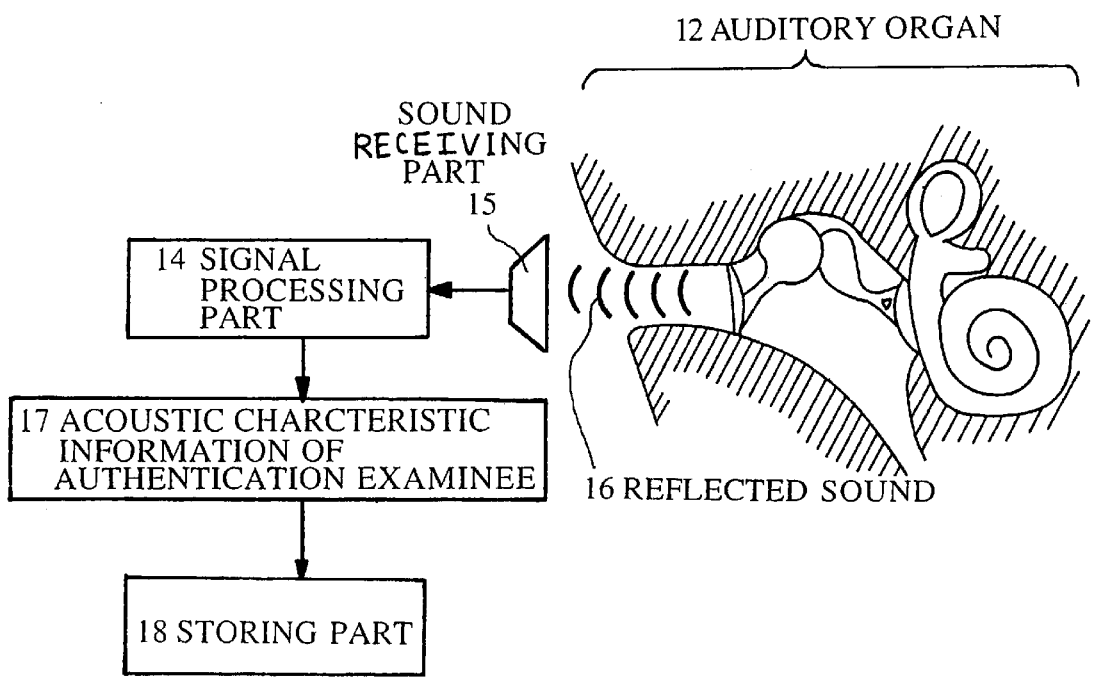

Schematic diagrams showing measurement of acoustic characteristic information are shown in FIG. 2. FIG. 2A is a schematic diagram showing when sound is sent. FIG. 2B is a schematic diagram showing when sound is received. In FIG. 2A, the reference numeral 11 designates a sound sending part; 12, auditory organ of an authentication examinee; 13, sent sound; and 14, a signal processing part. In FIG. 2B, 15 designates a sound receiving part; 16, reflected sound; 17, acoustic characteristic information of the authentication examinee; and 18, a storing part to store the acoustic characteristic information.

As shown in FIG. 2A, under control of the signal processing part 14, sound 13 sent from the sound sending part 11 travels through the auditory organ 12. The sent sound is absorbed in part in the auditory organ 12 and the remainder is reflected in different places within the auditory organ 12 as shown in FIG. 2B, and reflected sound 16 is received by the sound receiving part 15.

The received sound is converted to an electrical signal and subjected to operations, with the result acoustic characteristic information 17 of the authentication examinee is outputted and stored in the storing part 18.

Figure 3:
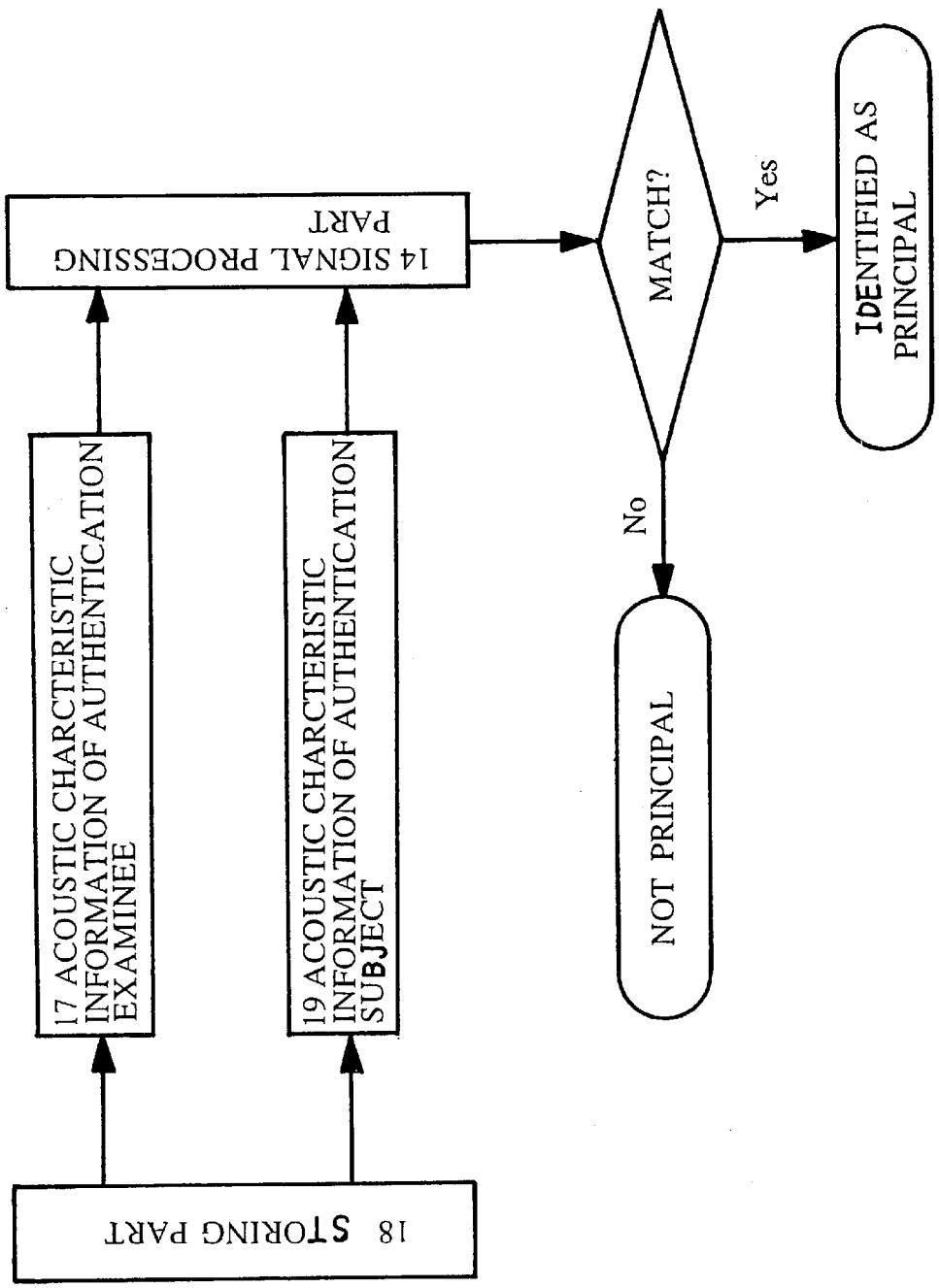
FIG. 3 is a schematic diagram showing individual authentication of one embodiment of the present invention.

A schematic diagram showing individual authentication is shown in FIG. 3. In FIG. 3, the reference numeral 19 designates acoustic characteristic information of the authentication examinee collected in advance. The storing part 18 is stored with the acoustic characteristic information 19 of the authentication examinee collected in advance, and acoustic characteristic information 17 of the authentication examinee measured immediately before, and the signal processing part 14 reads the two pieces of information from the storing part 18 to compare them. If the comparison gives an equal result, it is determined that the authentication examinee is the principal to be authenticated, and if the comparison gives an unequal result, it is determined that the authentication examinee is not the principal to be authenticated, and individual authentication is thus completed.

Where the reflected sound (reflected wave) 16 is used as described above, preferably a high-frequency sound wave is used to increase resolution. Concretely, estimation will be made using values. For example, where sound of 1 MHz is used, if sound speed in the air is assumed as 300 m/s, wavelength is about 0.3 mm, and if the reciprocation distance from an external ear 1 to an eardrum 4 is 6 cm, time required for reciprocation is 200 $\mu$s. Since the cycle of sound of 1 MHz is 1 $\mu$s, if the length of sound sent is from several cycles to tens of cycles, a reflected wave from the eardrum 4, a reflected wave from auditory ossicles 5, and a reflected wave from a cochlea 7 can be received individually on a time axis.

Since the positions and sizes of members within the auditory organ depend on individuals, and reflected wave characteristics from different members also depend on individuals, the above described time characteristics of reflected waves can be used for individual authentication. The use of the magnitudes (reception intensity) of the reflected waves in addition to the above described time characteristics of the reflected waves would contribute to an increase in authentication accuracy.

In FIG. 2, the sound sending part 11 and the sound receiving part 15 are described as parts different from each other. However, these may be implemented as different roles of an identical part having both a sound sending function and a sound receiving function.

Although the sound sending part 11, the sound receiving part 15, and a part (not shown) having a sound sending/receiving function are preferably piezoelectric elements typified by PZT, they may be electrodynamic elements typified by voice coils or electrostatic elements typified by capacitors.

In FIG. 3, acoustic characteristic information 17 of an authentication examinee and acoustic characteristic information 19 of authentication subjects are read from the storing part 18. However, the different pieces of information may be stored in separate means so that they are read from a pertinent means as required.

A method of authenticating individuals by comparing and identifying acoustic characteristic information may be implemented by a software program, the program may be saved in recording media and read into comparing and judging means for execution as required, or it may be downloaded from the outside by some communication means such as wireless communications and the Internet as required and be read into the comparing and judging means.

(Third Embodiment)

In this embodiment, a description will be made in detail of individual authentication when the individual authentication apparatus described in the second embodiment does not have the sound receiving part 15.

Figure 4:
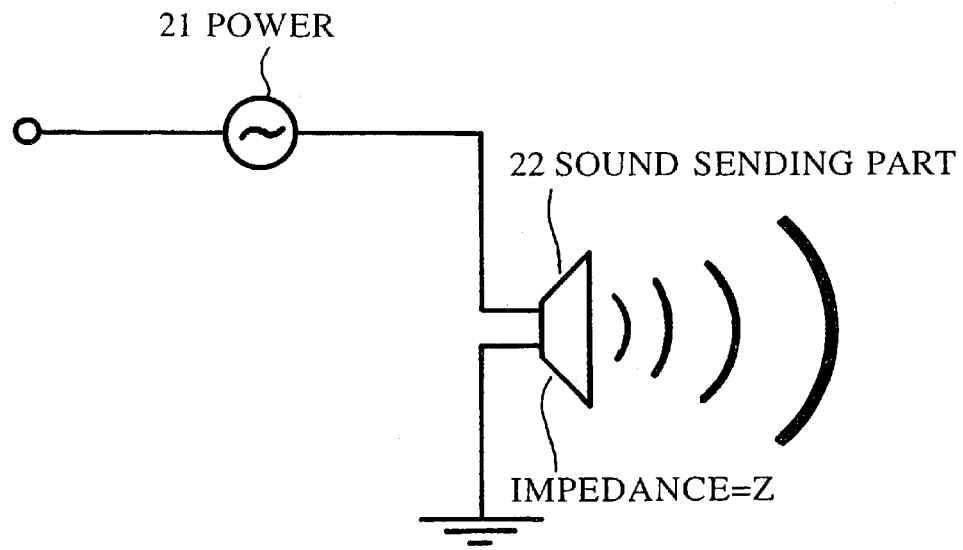
FIG. 4 is schematic diagrams showing changes of electrical impedance of a sound sending part of one embodiment of the present invention.
Figure 4:
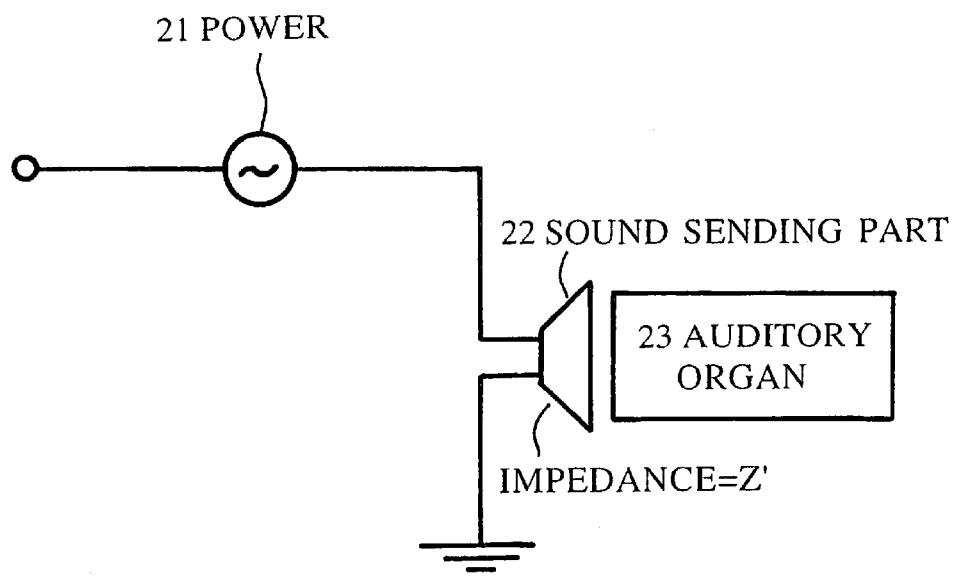

Schematic diagrams showing changes of electrical impedance of a sound sending part are shown in FIG. 4. The reference numeral 21 designates power; 22, a sound sending part; and 23, auditory organ.

FIG. 4A shows a state in which the sound is sent to an open space. FIG. 4B shows a state in which sound is sent to a closed space when the sound sending part 22 and the auditory organ 23 are close to each other.

As shown in FIG. 4A, assumedly, the electrical impedance of the sound sending part 22 when it sends sound to an open space is Z. As shown in FIG. 4B, if the auditory organ 23 is brought close to the sound sending part 22, the electrical impedance of the sound sending part 22 changes from Z to Z' by acoustic impedance of the auditory organ 23.

The acoustic impedance of the auditory organ 23 depends on individuals and electrical impedance also changes according to the acoustic impedance, with the result that electrical impedance Z' also depends on individuals. That is, individual authentication can be implemented by using electrical impedance, which is acoustic characteristic information.

Equivalent circuits are used to give a more detailed description.

Figure 5A:
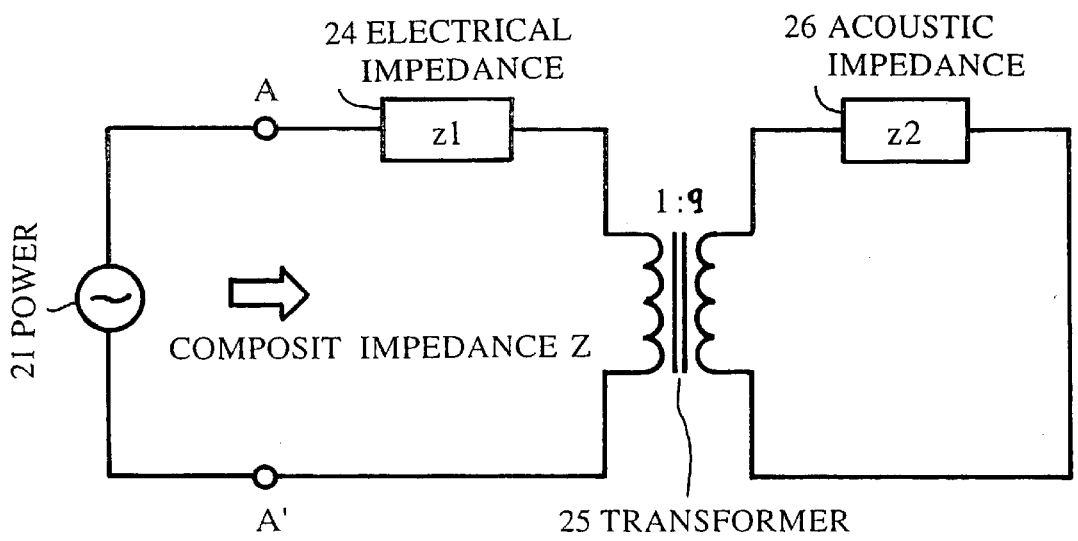
FIG. 5 is equivalent circuit diagrams of an electrical system and an acoustic system of one embodiment of the present invention.
Figure 5B:
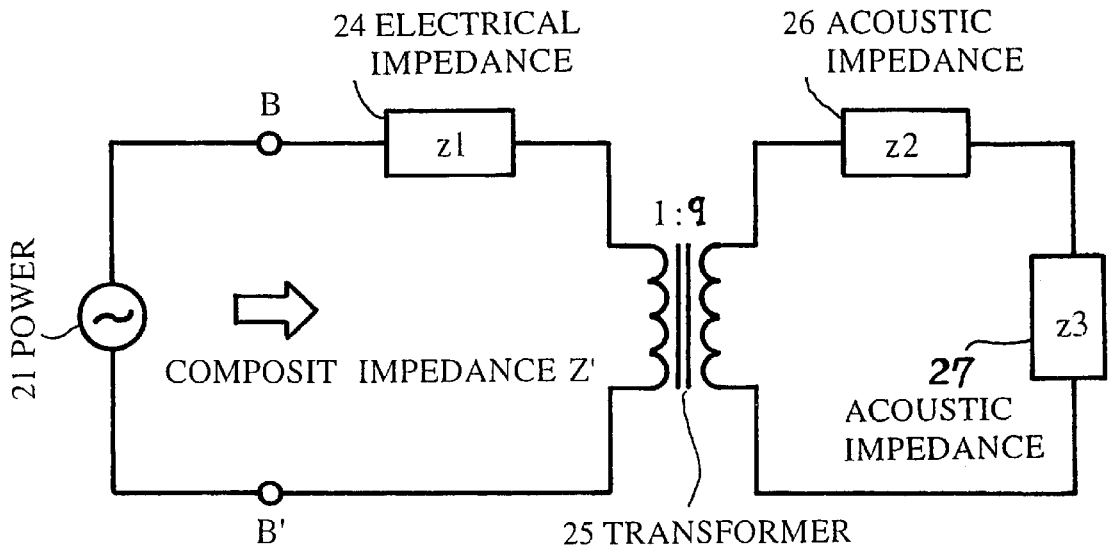

FIG. 5A shows an equivalent circuit of an electrical system and an acoustic system when the sound sending part 22 sends sound to an open space as shown in FIG. 4A. FIG. 5B shows an equivalent circuit of an electrical system and an acoustic system when the sound sending part 22 sends sound in a state in which it is close to the auditory organ 23, as shown in FIG. 4B. The reference numeral 21 designates power; 24, electrical impedance having the value of z1; 25, a transformer (mainly formed by air) connecting the electrical system and the acoustic system; 26, acoustic impedance constantly having the value of z2; and 27, acoustic impedance having the value of z3 developing when the auditory organ 23 is brought close to the sound sending part 22.

The equivalent circuit shown in FIG. 5 has an electrical system circuit as a primary circuit at the left of a transformer 25, and an acoustic system circuit as a secondary circuit at the right of the transformer 25.

In the equivalent circuit of FIG. 5A, the acoustic impedance 26 of the secondary circuit is recognized as electrical impedance zt through the transformer 25 when viewed from the primary circuit side, and if the transformer 25 has a transformation ratio of 1 to q between the primary side and the secondary side, a relation of $zt=z2/(q\times q)$ is satisfied. That is, electrical composite impedance Z to the right of the line A–A' in the equivalent circuit is represented by the sum of the value z1 of the electrical impedance 24 and the zt, as shown below.

$$Z=z1+zt=z1+z2/(q\times q)$$

The value z is the electrical impedance of the sound sending part 22 shown in FIG. 4A.

On the other hand, the acoustic impedances 26 and 27 of the secondary circuit are recognized as $zt'=(z2+z3)/(q\times q)$ when viewed from the primary circuit side. That is, electrical composite impedance Z' to the right of the line B–B' is represented as shown below.

$$Z=z1+zt'=z1+(z2+z3)/(q\times q)$$

Like the case of FIG. 5A, the value Z' is the electrical impedance of the sound sending part 22 shown in FIG. 4B.

Next, changes of the electrical impedance will be examined. An electrical impedance difference ΔZ developing when the auditory organ 23 is brought close to the sound sending part 22 is represented by ΔZ=Z'−Z, and it will be understood from the forgoing description that $\Delta Z=z3/(q\times q)$ is satisfied. z3 is the acoustic impedance 27 developing when the auditory organ 23 is brought close to the sound sending part 22, and its value depends on individuals. That is, the difference can be used to implement individual authentication.

Figure 6:
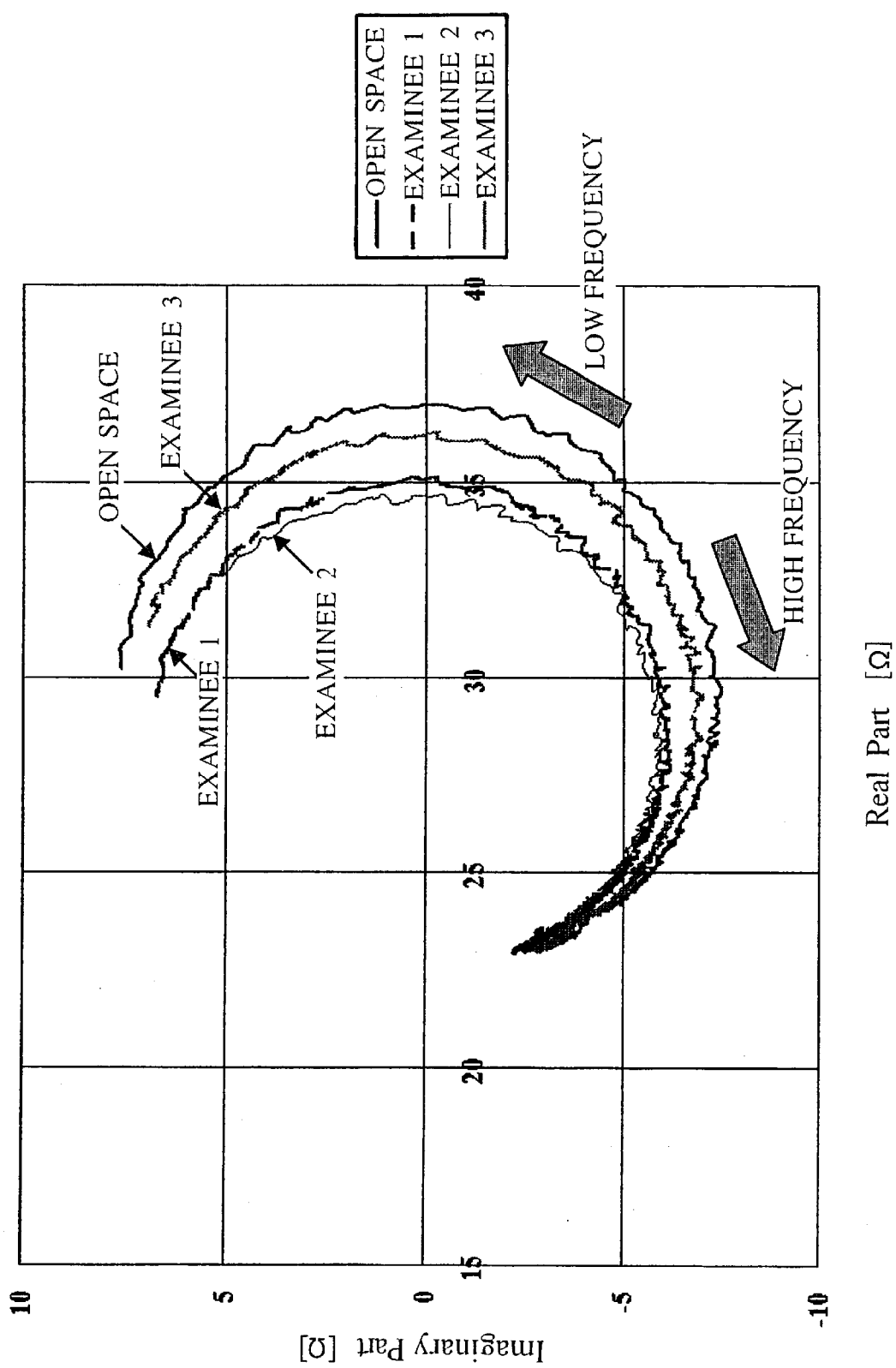
FIG. 6 is a graphical representation of changes of electrical impedances of a given loudspeaker when sounds from 100 Hz to 500 Hz in frequency are sent from the loudspeaker in one embodiment of the present invention; the impedance data is obtained for each of four cases, "the sounds sent to an open space", "examinee 1", "examinee 2", and "examinee 3".

Concretely, an example showing differences among individuals will be described below. FIG. 6 is a graph showing differences among individuals of electrical impedance when the sound sending part 22 is brought close to the auditory organ 23. FIG. 6 is a graphical representation of changes of electrical impedances of a given loudspeaker when sounds from 100 Hz to 500 Hz in frequency are sent from the loudspeaker; the impedance data is obtained for each of four cases, "the sounds sent to an open space", "examinee 1", "examinee 2", and "examinee 3". Data of an examinee was obtained using a headphone so that a loudspeaker was fixed in identical conditions in the vicinity of an ear of the examinee. Obtained impedances are indicated by the absolute values and phases thereof and are plotted on coordinates with real numbers on a horizontal axis and imaginary numbers on a vertical axis, as shown in FIG. 6.

It will be appreciated from FIG. 6 that electrical impedances are different among examinees. In the range from 100 Hz to 500 Hz, lower frequencies make the differences more conspicuous, indicating that the use of low-frequency regions is suitable for individual authentication under this apparatus configuration.

Electrical impedances are easily obtained by measuring circuit voltages and currents, and are usually represented by the absolute values and phases of the impedances. Herein, assumedly, both the absolute values and phases of the impedances have the respective measurement resolutions of 256. In this case, a theoretical maximum number of persons that can be authenticated is 256×256 or 65,536. The maximum number of persons that can be authenticated can be further increased by increasing the types of frequencies of sounds sent from the sound sending part 22. For example, if 11 types of frequencies are used up to 1000 Hz in increments of 100 Hz from 100 Hz, a theoretical maximum number of persons that can be authenticated is 65536×11 or 720,896.

It is of course that the use of a large number of frequencies advantageously not only increases a maximum number of persons that can be authenticated, but also increases authentication accuracy.

(Fourth Embodiment)

In this embodiment, a description will be made of an information communication apparatus provided with the individual authentication apparatus described in the second embodiment. Herein, a cellular phone is used as a typical example of information communication apparatuses. However, a microcellular phone, a desk phone handset, and a headphone and earphone connected to a portable terminal equipment having a communication function such as PDA and notebook size personal computers are also suitably used.

A loudspeaker for sound is incorporated in a cellular phone. The loudspeaker is used as the sound sending part 11 in FIG. 2A. Although, as the sound receiving part 15, a microphone may be installed in the vicinity of the loudspeaker of the cellular phone, it is very convenient that the loudspeaker converting an electrical signal to sound is used as the sound sending part 11 and the sound receiving part 15 because it can also generally convert sound to an electrical signal.

Furthermore, the cellular phone, which is provided with the signal processing part 14 and the storing part 18, is very suitable for implementing the individual authentication means described in the second embodiment.

Next, a description will be made in detail of an example that an owner of a cellular phone actually activates an individual authentication apparatus to prevent other than the owner of the cellular phone from illegal use.

The owner of the cellular phone in advance measures the acoustic characteristics of the auditory organ of his own, that is, the authentication subject and stores the information 19 in the storing part 18. When a call arrives, if individual authentication is not passed, that is, if acoustic characteristic information 17 of an authentication examinee and the acoustic characteristic information 19 do not match, a line is not opened.

In this case, although it is natural that human voice is used as the sent sound 13 used for individual authentication because the sound sending part 11 is a loudspeaker, a ringing tone for indicating call arrival or a special tone for individual authentication is also suitable. By using individual authentication in this way, illegal use by other than the owner of the cellular phone can be prevented. For desk phone handsets not incorporating the signal processing part 14 and the storing part 18, it is of course that the same individual authentication as with cellular phones and microcellular phones can be carried out by sending the measured acoustic characteristic information of the authentication examinee to a server or the like over a fixed line to perform storing and signal processing.

A method of authenticating individuals by comparing and identifying acoustic characteristic information may be implemented by a software program, the program may be saved in recording media and read into comparing and judging means for execution as required, or it may be downloaded from the outside by some communication means such as wireless communications and the Internet as required and be read into the comparing and judging means.

It is of course that the individual authentication apparatus using changes of electrical impedances as described in the third embodiment may be mounted.

(Fifth Embodiment)

In this embodiment, a description will be made of an individual authentication system in which an authentication examinee has the function typified by FIG. 2 describing a means for measuring acoustic characteristics, and an authentication executor has the function typified by FIG. 3 describing a means for authenticating individuals, whereby individual authentication can be carried out.

Assumedly, an individual uses online shopping performing individual authentication over a cellular phone and a means for measuring acoustic characteristics as shown in FIG. 2 is incorporated in the cellular phone.

As a preparatory step, the individual measures acoustic characteristic information 19 of his own, that is, the authentication subject, using the means for measuring acoustic characteristics of the cellular phone, and presents the information to a shopping sponsor.

The sponsor stores the acoustic characteristic information 17 in the storing part 18 of a server or the like.

Next, a settlement of actual shopping by the individual is arranged in advance. The individual delivers the will to purchase a certain product over phone, facsimile, the Internet, etc., and the sponsor obtains reconfirmation of the purchase will from the individual by voice or electronic mail to a cellular phone of the individual.

Herein, as a proof of reconfirmation of the purchase will, the individual sends the acoustic characteristic information 17 of his own, that is, the authentication examinee measured at that place to the sponsor. The sponsor compares acoustic characteristic information 19 of authentication subjects registered in advance, and the acoustic characteristic information 17 of the authentication examinee sent as a proof of reconfirmation of the purchase will, and if they match, the sponsor starts arrangements for delivering the product to the individual.

By using such an authentication system, illegal use by other than the owner of the cellular phone can be prevented.

Although the present invention has been described based on preferred embodiments shown in the drawings, it is apparent that those skilled in the art can easily change or modify the present invention, and such modifications are also included in the scope of the invention.

What is claimed is:

1. An individual authentication apparatus, comprising:
   a means for measuring acoustic characteristic information of an auditory organ wherein the means includes a sound sending part and a signal processing part for performing signal processing for sound information; and
   a means for authenticating individuals wherein the means comprises a storing part for storing acoustic characteristic information of an auditory organ collected in advance, and a signal processing part that compares the stored acoustic characteristic information and measured acoustic characteristic information,
   wherein the signal processing part for performing signal processing for sound information measures a difference of electrical characteristics of the sound sending part between one occasion when the sound sending part sends the sound to an open space and another occasion when the sound sending part sends the sound to a closed space in a manner that the sound sending part and the auditory organ of an authentication examinee are close to each other, as an acoustic characteristic information of the auditory organ.

2. The individual authentication apparatus according to claim 1, wherein the acoustic characteristic information is acoustic impedance.

3. The individual authentication apparatus according to claim 1, wherein the acoustic characteristic information is reflected wave characteristic information.

4. The individual authentication apparatus according to claim 1, wherein the sound sending part is a piezoelectric element.

5. The individual authentication apparatus according to claim 1, wherein the sound sending part is a voice coil.

6. An information communication apparatus equipped with an individual authentication apparatus, the individual authentication apparatus comprising:
   a means for measuring acoustic characteristic information of an auditory organ wherein the means includes a loudspeaker for sending sound, and a signal processing part for performing signal processing for sound information; and
   a means for authenticating individuals by using a storing part for storing acoustic characteristic information of an auditory organ collected in advance, and a signal processing part that compares the stored acoustic characteristic information and measured acoustic characteristic information,
   wherein the signal processing part for performing signal processing for sound information measures a difference of electrical characteristics of the sound sending part between one occasion when the sound sending part sends the sound to an open space and another occasion when the sound sending part sends the sound to a closed space in a manner that the sound sending part and the auditory organ of an authentication examinee are close to each other, as an acoustic characteristic information of the auditory organ.

7. The information communication apparatus according to claim 6, wherein the acoustic characteristic information is acoustic impedance.

8. The information communication apparatus according to claim 6, wherein the acoustic characteristic information is reflected wave characteristic information.

9. The information communication apparatus according to claim 6, wherein the loudspeaker employs piezoelectric elements.

10. The information communication apparatus according to claim 6, wherein the loudspeaker employs voice coils.

11. The information communication apparatus according to claim 6, wherein sound sent from the loudspeaker is voice.

12. The information communication apparatus according to claim 6, wherein sound sent from the loudspeaker is a ringing tone used to call individuals.

13. The information communication apparatus according to claim 6, wherein sound sent from the loudspeaker is a special tone used to authenticate individuals.

14. The information communication apparatus according to claim 6, wherein acoustic characteristic information of an auditory organ of an authentication examinee collected in advance is stored in the storing part, wherein acoustic characteristic information of an auditory organ of the authentication examinee is measured at a moment when authentication is required, and wherein the acoustic characteristic information of the auditory organ collected in advance and the acoustic characteristic information of the auditory organ of the authentication examinee actually measured as above are compared for authenticating individuals, and then opening or not-opening of a line is determined based on the result of the said individual authentication.

15. An information communication method including following steps:

sending sound by a sound sending part of an information communication apparatus;

measuring a difference of electrical characteristics of the sound sending part between one occasion when the sound sending part sends the sound to an open space and another occasion when the sound sending part sends the sound to a closed space in a manner that the sound sending part and the auditory organ of an authentication examinee are close to each other as acoustic characteristic information of an auditory organ as acoustic characteristic information of an auditory organ, collecting the acoustic characteristic information of an auditory organ in advance by said measuring operation, and storing the acoustic characteristic information of an auditory organ;

measuring acoustic characteristic information of an auditory organ of an authentication examinee by said measuring operation at a moment when authentication is required, and authenticating individuals by comparing the acoustic characteristic information collected in advance and the acoustic characteristic information of the auditory organ of the authentication examinee measured in said measuring operation; and performing opening or not-opening of a line at a moment when communication is required, based on the result of the said individual authentication.

\* \* \* \* \*